United States Patent [19]

Atwell et al.

[11] Patent Number: 5,077,337
[45] Date of Patent: Dec. 31, 1991

[54] FLAME RETARDANT GRAFT COPOLYMERS OF POLYPROPYLENE

[75] Inventors: Ray W. Atwell; Nicolai A. Favstritsky, both of W. Lafayette; Harry A. Hodgen, Battle Ground; Enrico J. Termine, Lafayette, all of Ind.

[73] Assignee: Great Lakes Chemical Corporation, West Lafayette, Ind.

[21] Appl. No.: 483,132

[22] Filed: Feb. 22, 1990

[51] Int. Cl.$^5$ .................... C08L 51/06; C08F 255/02
[52] U.S. Cl. ........................ 525/72; 525/288; 524/468; 524/469; 524/504; 524/535
[58] Field of Search ................. 525/288, 72

[56] References Cited

U.S. PATENT DOCUMENTS

| | | | |
|---|---|---|---|
| 3,050,476 | 8/1962 | Tress et al. | 525/333.4 |
| 3,177,270 | 4/1965 | Jones et al. | 525/285 |
| 3,458,597 | 7/1969 | Jabloner | 260/877 |
| 3,959,398 | 5/1976 | Jalics | 525/33.4 |
| 4,179,401 | 12/1979 | Garnett et al. | 252/429 |
| 4,279,808 | 7/1981 | Hornbaker et al. | 525/72 |
| 4,857,576 | 8/1989 | Kochi et al. | 525/332.2 |

FOREIGN PATENT DOCUMENTS

| | | |
|---|---|---|
| 3337223 | 5/1985 | Fed. Rep. of Germany . |
| 443965 | 2/1969 | Japan . |
| 55023151 | 2/1980 | Japan . |

OTHER PUBLICATIONS

M. Hartmann et al., Z. Chem., 20(4), 146–7 (1980).

P. Citovicky et al., Thermochim Acta, 93, 171–174 (1985).

B. J. Hill et al., Comm. Eur. Communities [Rep.] Eur, Eur 6718 (1980).

Primary Examiner—Carman J. Seccuro

[57] ABSTRACT

Described are polypropylene polymer compositions which have suprisingly good physical properties in combination with flame retardancy, which include graft copolymers represented by the formula:

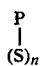

wherein n is $> 1$, P is polypropylene, and S is a grafted side chain having brominated monomeric units of the formula:

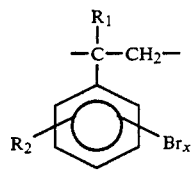

wherein $x = 1$ to 4, $R_1$ is H or $CH_3$, and $R_2$ is H or a $C_{1-4}$ lower alkyl group. Polymer blends including such graft copolymers and methods for making flame retardant polymer compositions are also described.

47 Claims, No Drawings

FLAME RETARDANT GRAFT COPOLYMERS OF POLYPROPYLENE

BACKGROUND OF THE INVENTION

This invention resides in the field of flame retardant polymers. More particularly, it relates to flame retardant polymer compositions which include graft copolymers of polypropylene and brominated vinyl aromatics such as brominated styrenes, and to methods for making these compositions.

By way of background, polypropylene has proven to be one of the most useful and versatile polymers. Its physical properties make it ideal for many applications including molded articles, spun fibers, hot melt adhesives and many others. These properties include, for instance, good solvent resistance, surface appearance and stain resistance, and low moisture absorption. However, polypropylene does not possess adequate flame retardancy for certain applications. In view of its other desirable physical properties, it has naturally been a matter of great interest to provide polypropylene compositions having greater flame retardancy.

Improvement of flame retardancy has relied on modifications to polypropylene, or on additives for the polypropylene, but disadvantages have been associated with both approaches. Although a vast number of modified polypropylene compositions have been described or theorized in the prior art, few if any suitable flame retardant polypropylene derivatives have been identified. Similarly, numerous additives for increasing the flame retardancy of polypropylene have been studied and some are commercially available. Nonetheless, there is at present no commercially available flame retardant additive for polypropylene which provides adequate retention of polypropylene's physical properties, and demonstrates high thermal stability, non-migration of additive to the surface, and absence of solids at processing temperatures. The present invention contemplates a modification of polypropylene which yields a composition that retains the desirable physical properties of polypropylene, and avoids the disadvantages of alternate approaches.

In particular, the modified polypropylene of the invention avoids the frequently encountered migration or "bloom" of inert additive-type flame retardants to the surface of molded articles. Such bloom leads to unsightly surface discoloration on articles molded from the polypropylene and thereby effectively limits the amount of additive which can be used. Further, these inert additives frequently remain solid at processing temperatures, which can damage or foul processing equipment. For example, inert additives remaining solid at processing temperatures are known to cause problems by clogging spinnerettes used in equipment for producing spun fibers. This type of equipment fouling not only reduces the efficiency of processing but can also necessitate the costly refurbishment or premature replacement of equipment.

The applicants' preferred modified polypropylenes also avoid many other problems encountered in the prior art by having only low levels of unreacted styrene monomer, typically less than 1% by weight. For example, by this aspect the applicants' invention provides a vehicle to avoid monomer juicing problems known to occur in prior art graft modified compositions. It is also significant that the compositions of the present invention can be efficiently processed without the release of excessive volatile monomer into the surrounding environment, which can be hazardous to those working with or near the materials. The prior art has failed to appreciate these substantial advantages of the compositions of the present invention.

As noted above, known flame retardant additives for polypropylene have recognized drawbacks. One such additive is hydrated alumina, which retards flame by releasing water under fire conditions. However, high loadings of hydrated alumina are necessary to give desired efficacy, and this results in very poor physical properties of the polypropylene and articles molded therefrom.

Certain other available additives remain solid at normal polypropylene processing temperatures and thus complicate processing. Such additives include, for example, a bisimide-containing aliphatic bromine additive known as BN-451 from Ethyl Corp. of Sayreville, N.J., and a ring brominated polystyrene additive known as Pyro-Chek 68PB from Ferro Corp. of Cleveland, Ohio. The latter use of ring brominated polystyrene as an additive to polypropylene, rather than as a graft onto polypropylene, is a particularly clear demonstration of the failure of the prior art to recognize the present invention. Other available additives, such as decabromodiphenyl oxide, not only remain solid at processing temperatures but also are known to rise or "bloom" to the surface of molded articles.

Aside from these inert additives, reports exist in the literature of attempts to chemically bond or graft flame retardants to polypropylene. To the applicants' knowledge, none of these techniques has been commercialized. For instance, M. Hartmann, et al., Z. Chem., 20(4), 146-7 (1980), report preparing graft copolymers of atactic polypropylene and four respective vinylphosphonic acid derivatives. Two of the four copolymers prepared were reported as self extinguishing when containing greater than 3% by weight phosphorous.

P. Citovicky et al., Thermochim. Acta., 93, 171-4 (1985), disclose a two-step procedure in which glycidyl methacrylate was grafted to isotactic polypropylene followed by reaction with various flame retardants including bromoacetic acid, 3,3',5,5'-tetrabromo-2,2'-dihydroxybiphenyl, dichloroacetic acid, or phenyldihydrogen phosphate. The copolymer reacted with Ph dihydrogen phosphate gave the highest limiting oxygen index value and was also reported the most thermally stable. In general, this technique is not particularly advantageous since it requires two steps and the flame retardant must be a functionalized molecule capable of reaction with an epoxide.

B. J. Hill et al., Comm. Eur. Communities [Rep.] EUR, EUR 6718 (1980), report irradiation grafting of bis(2-chloroethyl)vinylphosphonate to polyester and polypropylene fabrics to render them self-extinguishing. The authors report that the bis(2-chloroethyl)vinylphosphonate had poor reactivity toward the fabrics. Comonomers were therefore required which in some instances diminished flame retardancy and/or stiffened the fabrics.

K. Nakatsuka et al., Japan JP 44/3965 (Feb. 19, 1969), report air oxidizing polypropylene at elevated temperatures to introduce peroxy groups to the polymer followed by graft polymerization with $CH_2CClCO_2Me$. The product was reported to be self-extinguishing.

Outside of the field of flame retardancy, various modifications to polyolefins have been proposed. For example, U.S. Pat. No. 4,179,401, issued to Garnett et al. in 1979, relates to a process for producing a heterogenous catalyst for the hydrogenation, hydroformylation, isomerization, cracking or dehydrogenation of organic molecules. The Garnett process comprises the steps of radiation grafting a monomer having an alpha- unsaturated bond to a metal or an organic polymer and complexing a nitrogen, halogen, or phosphorous containing group to the monomer. The Garnett et al. patent lists many possible polymer/monomer combinations. Identified polymer substrates included polyvinyl compounds, polyolefins, polyvinylidenes, polysiloxanes, polydienes, polyethers, polyimides, polysulphones, polyesters, polyamides, polyurethanes, polycarbonates and polyureas. Listed as possible monomers for use in the described process were p-nitrostyrene, p-amino styrene, p-chlorostyrene, vinyldiphenylphosphine, cis-bis (1,2-diphenylphosphino) ethylene, triallylphosphine, divinylphenylphosphine and many more.

Similarly, U.S. Pat. No. 3,177,270, issued to Jones et al. in 1965, describes a method for modifying polyethylene and other substrates for the purpose of improving tensile strength, elongation and/or flexural modulus. The Jones et al. patent specifically described the preparation of ethylene polymer modified with styrene, a styrene/acrylonitrile mixture, dichlorostyrene or a mixture of isomeric vinyltoluenes. The Jones et al. patent additionally lists other possible polymeric substrates for use in the described method as including polypropylene, polyisobutylene, polybutene, and copolymers of ethylene and propylene, ethylene and butene, ethylene and styrene, ethylene and vinyl acetate, and ethylene and methyl methacrylate. Possible graft monomers are listed as including styrene, vinyltoluene, vinylxylene, ethylvinylbenzene, isopropyl styrene, para-tert-butyl styrene, dichlorostyrene, bromostyrene, fluorostyrene, or mixtures thereof with acrylic acid, methacrylic acid, acrylonitrile, methacrylonitrile, methyl methacrylate or maleic anhydride.

As is evident from the foregoing, past efforts to provide a polypropylene composition with improved flame retardancy have not been fully satisfactory. Available inert flameproofing additives have exhibited drawbacks such as bloom and interference with desired physical properties. Additionally, polypropylene materials have not been provided with grafted fire retardants which perform as well as the present inventive compositions. Accordingly, there has remained a need for fire retardant polypropylene compositions demonstrating good physical properties, and the applicants' invention addresses this need.

SUMMARY OF THE INVENTION

Accordingly, a first preferred embodiment of this invention provides a flame retardant graft copolymer composition comprising:

$$P\underset{|}{\phantom{P}}(S)_n$$

in which n is an integer $> 1$, P is polypropylene, and S is a side chain grafted to the polypropylene and having brominated monomeric units of the formula:

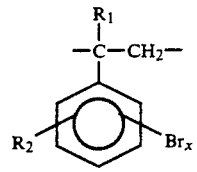

wherein $x = 1$ to 4, $R_1$ is H or $CH_3$, and $R_2$ is H or a $C_{1-4}$ lower alkyl group. In an alternate embodiment, the composition additionally includes a homopolymer of the brominated monomeric units.

Another preferred embodiment of this invention provides a flame retardant polymer composition comprising a blend of (i) polypropylene, and (ii) a polymer composition including a graft copolymer according to the first embodiment above and constituted about 10% to about 60% bromine by weight. Such a blend can be prepared by diluting or "letting down" the bromine-concentrated polymer composition (ii) with a desired amount of polypropylene. After let down, the blend preferably comprises about 1% to about 20% bromine by weight of the blend.

Another preferred embodiment of this invention provides a method for producing a flame retardant polymer composition which comprises the step of graft polymerizing polypropylene with a monomer having the formula:

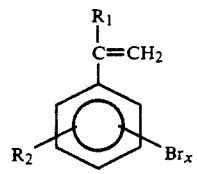

wherein $x = 1$ to 4, $R_1$ is H or $CH_3$, and $R_2$ is H or a $C_{1-4}$ lower alkyl group. The invention provides a flame retarding amount of bromine in the graft polymerization product.

One object of this invention is to provide flame retardant polypropylene-based polymer compositions.

Another object of this invention is to provide a method for Producing flame retardant polypropylene-based polymer compositions.

Additional objects and advantages will be apparent from reading the description which follows.

DESCRIPTION OF THE PREFERRED EMBODIMENTS

For the purposes of promoting an understanding of the principles of the invention, reference will now be made to preferred embodiments of the invention and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

The present invention provides compositions which have physical properties comparable to that of polypropylene, but which have improved flame retardancy. In the broadest sense, polypropylene is modified by grafting a ring-brominated vinyl aromatic onto the polypropylene. The presence of the bromine contributes to the flame retardancy of the resulting polymer. In contrast to the prior art, a significant portion of the bromine present in the compositions of the present invention is grafted onto, i.e. attached to, the polypropylene through the monomeric unit. In addition, it is contemplated that the final compositions may also include bromine in the form of homopolymers of the monomer used in grafting the polypropylene. Although not to be considered limiting of the present invention, it is believed that the compatibility of the grafted polypropylene and the homopolymer contributes to the desirable physical properties of the resulting composition.

In accordance with the above discussion, one embodiment of this invention includes a flame retardant polymer composition comprising a graft copolymer represented by the formula:

in which n is an integer $>1$, P is polypropylene, and S is a side chain grafted to the polypropylene and having monomeric units of the formula:

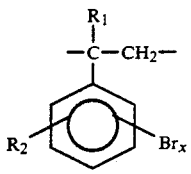

wherein $x = 1$ to 4, $R_1$ is H or $CH_3$, and $R_2$ is H or a $C_{1-4}$ lower alkyl group.

The form of the polypropylene used in the present invention is not critical so long as it undergoes suitable graft polymerization to yield the indicated compositions. Thus the polypropylene base in the graft copolymer can include crystalline polypropylene homopolymer in isotactic, syndiotactic, or atactic (also commonly known as "amorphous") form. Further, polypropylene materials with melt indices of about 0.1 to about 200 grams per 10 minutes (as measured by ASTM D-1238) can be employed.

The polypropylene is graft polymerized with a ring-brominated vinyl aromatic which is also optionally alpha- or ring-substituted with one or more aliphatic groups including lower alkyl groups such as methyl, ethyl, and propyl and butyl isomers. This monomer is preferably a styrene having 1 to 4 ring-substituted bromines. However, it will be appreciated that monovinyl aromatics, including for instance styrenes which are alpha- or ring-substituted with one or more lower aliphatic groups as described herein, function similarly to styrene in grafting procedures and are accordingly also within the scope of this invention. In this vein, methyl is a preferred optional alpha-substituted alkyl group and $C_{1-4}$ lower alkyls are preferred optional ring-substituted alkyl groups.

Accordingly, preferred brominated monomers suitable for the graft polymerization process have the formula:

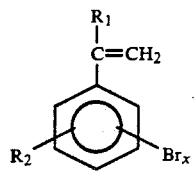

wherein $x = 1$ to 4, $R_1$ is H or $CH_3$, and $R_2$ is H or a $C_{1-4}$ lower alkyl group.

In accordance with this formula the preferred styrene monomer has 1 to 4 bromines per styrene, or can also include mixtures containing these mono-, di-, tri-, and/or tetrabromostyrenes. Pentabromostyrene is not a preferred styrene monomer as in the applicants work it has failed to efficiently graft to polypropylene either alone or in combination with a lesser-brominated styrene comonomer (see for instance Examples 4-6 below). It is desirable that the monomer material used for the graft polymerization be liquid at room temperature (about 25° C.). Mixtures of styrenes may accordingly be used which are liquid at room temperature and which have varying degrees of bromination to achieve a high percentage of bromine in the monomer material.

In another aspect, it is preferred that the stated levels of bromine be achieved with at least about 85% of the brominated monomeric units being di-, tri- or tetrabromo units or mixtures thereof, and more preferably with at least about 80% of the brominated monomeric units being dibromo units. The most preferred monomer is dibromostyrene. In commercial form dibromostyrene commonly includes minor levels of mono- and tribromostyrene. For example, the applicants have used dibromostyrene available from Great Lakes Chemical Corporation of West Lafayette, Ind., which normally contains about 15% monobromostyrene and about 3% tribromostyrene by weight. The preferred styrene monomer can also contain storage stabilizers as known and used in this field to inhibit premature Polymerization. As examples, these commonly include phenols and compounds of sulfur, nitrogen and phosphorous.

The ring-brominated vinyl aromatic is grafted to the polypropylene base using suitable known graft polymerization techniques which may be performed, for example, in solution, suspension, emulsion or bulk procedures. Grafting techniques include for instance irradiation, peroxidation by exposure to oxygen at elevated temperatures, and abstraction of protons by free radical initiators. Among these, the latter technique is preferred, with appropriate free radical initiators including dicumylperoxide, benzoylperoxide, t-butylperbenzoate, 2,2'-azobis(isobutyronitrile), cumenehydroperoxide or like initiators.

In a typical grafting procedure, the free radical initiator is dissolved in the brominated monomer at suitable levels, generally from about 0.1% to about 5% and preferably from about 1% to about 3% on weight of the monomer. The resulting solution is then added to agitated molten polypropylene. In this regard, the grafting is preferably performed in a kneading type mixer such as a Banbury mixer, or in an extruder or a two-roll mill, although other suitable mixers known in the art can also be used.

Additionally, the grafting is carried out at a suitable pressure and elevated temperature and for a duration sufficient to yield the desired end product. Generally, the temperature will be sufficiently high to reduce the viscosity of the molten polypropylene and to ensure thorough mixing. Moreover, where free radical initiators are used, this temperature will be high enough to promote decomposition of the initiator resulting in rapid polymerization of the monomer. In any case, preferred temperatures for the grafting procedure are from about 120° C. to about 230° C., with more preferred temperatures being about 170° C. to about 200° C.

The grafting proceeds readily at atmospheric pressure as well as at the elevated pressures encountered in commonly used plastics processing equipment. The duration of the grafting procedure will depend upon the temperature as well as the grafting technique used. In free radical initiated grafting, the duration will also depend upon the chosen initiator and the efficiency of mixing. Generally, however, durations ranging from about 1 second to several hours can be used, with about 10 to about 300 seconds resulting in an efficient polymerization and thus being preferred.

Graft polymerization will typically result in both grafted polypropylene and homopolymer of the selected monomer. It has been found that the grafted polypropylene and any homopolymer present remain well intermixed, even during processing. The homopolymer could alternatively be removed, but this is not necessary and the preferred composition therefore includes both grafted polypropylene and homopolymer.

The present invention provides polymer compositions having a flame retarding amount of bromine, about 1 weight % or more, based on the weight of the overall composition. This bromine may be present either in the grafted polypropylene or in a homopolymer mixed with the grafted polypropylene. In any event, however, the grafted polypropylene copolymer includes at least about 0.5%, and more preferably at least about 1%, bromine by weight. As processed (e.g. molded or spun), the preferred flame retardant polymer compositions of the invention will generally include about 1% to about 20% bromine by weight of the composition, and more preferably about 3 to about 15% bromine by weight.

In another preferred embodiment of the invention, a bromine-concentrated polymer composition is provided having about 10% to about 60% bromine by weight, or more preferably about 30% to about 50% bromine by weight, of the overall product. In this embodiment, the grafted polypropylene copolymer preferably includes at least about 5% bromine by weight for the broad range, and at least about 15% for the more preferred range. This composition can thereafter be let down with polypropylene prior to processing to yield a resulting composition having an appropriate level within the 1% to 20% or more preferred 3% to 15% bromine range.

A certain amount of bromine may also be present as a part of unreacted monomer, but this form is not preferred and the amount of unreacted monomer is desired to be relatively low. This will prevent or minimize juicing, i.e., migration of the monomer to the surface. The amount of unreacted monomer is preferably at most about 3% by weight, and more preferably at most about 1% by weight, of the overall composition. These low levels are generally achieved in the preferred products without the need for further processing steps. However, when desired the unreacted monomer can be removed, for example, by placing the graft polymerization products under vacuum.

The let down blends and other polymer compositions of the applicants' invention have demonstrated excellent flame retarding properties as, for instance, the specific Examples and Table 3 below demonstrate. In addition, the compositions of the invention, particularly the let down blends, have demonstrated excellent physical properties. This can be seen for example from the high values reported in Table 2 for impact strength and percent elongation of a blend prepared in Example 11. The combination of improved flame retardancy and desirable physical properties, especially without bloom, juicing, etc. found in prior art approaches, provide a significant and unexpected advantage, and highlight the magnitude of the applicants' discoveries. Additional materials which do not significantly interfere with the grafting procedure or the resulting products can also be used as known in the art or determined by routine experimentation. For instance, reactive additives such as chain transfer agents can be dissolved into the brominated monomer prior to grafting to control the molecular weight of the brominated polymer content of the graft procedure. Alkyl halides and mercaptans, for example, are suitable chain transfer agents for limiting the extent of styrene polymerization and thus the molecular weight of the styrene polymer chains. As will be understood, the product of the graft polymerization will normally contain brominated styrene polymer grafted to the polypropylene as well as brominated styrene homopolymer resulting from separate polymerization of the monomer. The chain transfer agent can thus be used to regulate the molecular weight of each.

Other reactive unsaturated comonomers can also be included during the grafting process to modify the properties of the resultant polymer composition. These can include for example maleic anhydride, styrene, chlormethylstyrene, acrylonitrile, methylmethacrylate, acrylic acid, butene, butadiene, acrylamide and many others as known in the art. Modifications which can be achieved by addition of other materials during the grafting process include alterations in color, clarity, lubricity, dyability, melt viscosity, softening point, thermal stability, ultraviolet stability, viscoeleastic behavior, polarity, biodegradability, static charge dissipation, strength and stiffness.

Nonreactive materials can also be included in the grafting procedure to modify product properties. As examples, antioxidants, ultraviolet absorbers, antistatic agents, pigments, dyes, nucleating agents, fillers, slip agents, lubricants, antiblocking agents, plasticizers, and/or antimicrobials can be included. These materials can be incorporated into the polypropylene prior to or during the grafting process Alternatively, these materials can be added in a separate compounding step which provides the advantage of avoiding possible interference by these additives with the grafting chemistry.

Additional flame retardants (aside from the brominated styrene) can also be included in the graft polymerization product when desired to improve efficiency and lower costs. These may be reactive flame retardants such as bis(2-chloroethyl)vinylphosphonate or acrylic acid esters of halogenated alcohols, or inert flame retardants such as antimony oxide, triphenylphosphate, or hexabromocyclododecane.

The invention will be further described with reference to the following specific Examples. It will be understood that these Examples are illustrative and not restrictive in nature. In the following Examples, percents indicated are percents by weight unless indicated otherwise.

EXAMPLE 1

Dibromostyrene Grafted Onto Polypropylene 63 g of dicumylperoxide were dissolved into 3157 g of dibromostyrene (also containing 15% by weight monobromo- and 3% by weight tribromostyrene) from Great Lakes Chemical Corporation of West Lafayette, Ind. In a continuous process the monomer was metered at 3.2 lbs/hr to a Werner & Pfleiderer twin screw extruder while simultaneously feeding polypropylene homopolymer (AMOCO 10-5219) at 17.6 lbs/hr. Temperature in the extruder was graduated from 170° C. in Zone 1 to 185° C. in Zone 5, and screw speed was 160 revolutions per minute (rpm's). The molten product was stranded into a water bath and was then granulated. The graft copolymer was found to contain 8.4% bromine and had a residual monomer content of 0.52%.

EXAMPLE 2

Concentrate Dibromostyrene/Polypropylene Graft Copolymer 24 g of dicumylperoxide were dissolved into 1212 g of Great Lakes Dibromostyrene. In a batch process, 250 g of the monomer plus peroxide were added to 105 g of molten polypropylene homopolymer (AMOCO 10-5219) in a Brabender Prep Center (a Banbury-type mixer). Bowl temperature was maintained at 180° C. while mixing at 50 rpm's as the monomer was being added over a 10 minute period. Following the addition of the last of the monomer, the mixture was held an additional 5 minutes at 180° C. The product was emptied from the bowl, cooled to room temperature and granulated. The graft concentrate was found to contain 40.5% bromine with a residual monomer content of 0.57%.

EXAMPLE 3

Tribromostyrene Grafted to Polypropylene

A mixture of 11.1 g of powdered tribromostyrene and 0.22 g of dicumylperoxide were dry blended. Separately, 48.9 g of polypropylene (AMOCO 10-5219) were melted in a small Brabender Plasticorder mixer at 180° C. and 60 rpm's, and the tribromostyrene/peroxide mixture was spooned in over a 2 minute period. The resulting graft copolymer was held an additional 5 minutes at 180° C./60 rpm's before cooling and granulating. The product was found to contain 10.6% bromine with a residual monomer content of 0.06%.

EXAMPLE 4

COMPARATIVE EXAMPLE

Attempt to Graft Pentabromostyrene to Polypropylene

A mixture of 9.9 g of powdered pentabromostyrene and 0.20 g dicumylperoxide were dry blended. Separately, 50.1 g of polypropylene (AMOCO 10-5219) were melted in a small Brabender Plasticorder mixer. Using the same conditions as in Example 3, the pentabromostyrene plus peroxide mixture was added. On removing the product from the bowl, powdery white residue was observed on the surface of the bowl and on areas of the product. The product was found to contain 13.1% bromine and 11.1% residual pentabromostyrene monomer, thus indicating that of the monomer charged failed to polymerize.

EXAMPLE 5

COMPARATIVE EXAMPLE

Attempt to Graft Pentabromostyrene to Polypropylene 8.3 g of powdered pentabromostyrene were dry blended with 0.16 g t-butylperbenzoate. The mixture was added in a single dose to 41.7 g polypropylene (AMOCO 10-5219) which was mixing at 190° C./60 rpm's in a Brabender Plasticorder. After 5 minutes at 190° C. the product was removed and granulated. The product was found to contain 12.6% bromine and 10.7% residual pentabromostyrene monomer, and thus 64% of the pentabromostyrene failed to polymerize.

EXAMPLE 6

COMPARATIVE EXAMPLE

Attempt to Co-graft Pentabromostyrene and Dibromostyrene

A slurry of 4.8 g of pentabromostyrene, 4.8 g of dibromostyrene and 0.19 g of dicumylperoxide was prepared. Using the conditions from Example 5, the slurry was added to 40.4 g of polypropylene (AMOCO 10-5219). The product was found to contain 11.9% bromine and 5.3% residual pentabromostyrene monomer. It also contained 1.6% residual mono- and dibromostyrene. Thus, based upon the amount of monomers added, 55% of the pentabromostyrene and 17% of the mono- and dibromostyrene failed to react.

EXAMPLE 7

A second graft copolymer was prepared using the procedure described in Example 1. A slightly faster rate of dibromostyrene addition was used, however, so that the product this time contained 9.1% bromine and 0.68% residual monomer.

EXAMPLE 8

150 g of atactic polypropylene (Ring and Ball softening point = 136° C., Brookfield Viscosity at 149° C. (300° F.) = 9900 centipoise) were melted in a Brabender Prep Center at 160° C. A mixture of 142.5 g Great Lakes Dibromostyrene, 3.0 g dicumylperoxide, and 4.5 g 1-Dodecanethiol was added over a 5 minute period while mixing at 50 rpm's. The temperature was increased to 180° C. and the product removed from the bowl. The product was a leathery solid containing 29.4% bromine and 0.16% residual monomer.

EXAMPLE 9

The graft copolymer from Example 1 was molded into test specimens using a Newbury Injection Molding Machine (Model HI-30 RS, Newbury Industries, Inc., Newbury, Ohio). Molding conditions are shown in Table 1:

TABLE 1

| Conditions for Injection Molding | |
|---|---|
| Injection Pressure, psi | 500 |
| Cycle time, sec. | 30 |
| Rear Temperature, °F. | 370 |
| Front Temperature, °F. | 380 |
| Mold Temperature, °F. | 75 |
| Screw Speed, rpm | 100 |
| Injection Time, sec | 10 |

EXAMPLE 10

The graft copolymer concentrate from Example 2 was dry blended with base polypropylene at a ratio of 700 g of graft concentrate per 1500 g of polypropylene (AMOCO 10-5219). The dry blend was then melt blended by passing it through a 30 mm twin screw extruder (Werner & Pfleiderer Model ZSK 30) at 180° C. The let down mixture was found to contain 12.9% bromine and 0.25% residual monomer.

EXAMPLE 11

The let down mixture from Example 10 was molded into test specimens using the procedures and conditions shown in Example 9.

EXAMPLE 12

COMPARATIVE EXAMPLE 390 g of polypropylene (AMOCO 10-5219) were dry blended with 11 g of polydibromostyrene homopolymer containing 58.5% bromine. The mixture was melt blended as in Example 10 to obtain a composition containing 12.9% bromine.

EXAMPLE 13

COMPARATIVE EXAMPLE

The composition from Comparative Example 12 was molded into test specimens using the procedures and conditions shown in Example 9.

EXAMPLE 14

COMPARATIVE EXAMPLE

Unmodified polypropylene (AMOCO 10-5219) was molded into test specimens using the Procedures and conditions shown in Example 9.

EXAMPLE 15

The composition from Example 7 was molded into test specimens using the procedures and conditions shown in Example 9.

EXAMPLE 16

Injection molded test specimens from Example 11 were maintained at 75° C. to 80° C. for 53 days in a gravity oven. Surfaces remained perfectly glossy with no trace of bleed, thus demonstrating the ability to achieve low levels of residual monomer in preferred compositions and by preferred methods of their preparation.

EXAMPLE 17

9.8 g of a molded specimen from Example 11 were dissolved in 279 g of boiling xylenes (Mallinckrodt #8664). The warm solution was added dropwise to 2 liters of vigorously stirring methanol. The precipitated polymer was removed by filtration and dried. Yield was 100%. A portion of the polymer (4.9 g)—now having greatly increased surface area—was treated with approximately 500 ml of methylene chloride in a Soxhlet Extractor for 6 hours. The methylene chloride solution was evaporated to dryness to obtain 0.94 g of solid which was found to contain 44.53% bromine. The polymer after extraction still contained 4.32% bromine, or 36% of the bromine present before extraction, thus evidencing in a conventionally accepted manner that the graft copolymerization product is not a simple blend of homopolymers but rather a new graft copolymer composition of matter which has been formed.

EXAMPLE 18

COMPARATIVE EXAMPLE 9.7 g of molded specimens from Comparative Example 13 were dissolved, precipitated and extracted as described in Example 17. 0.749 g of extract were recovered which contained 52.1% bromine. In contrast with the results of Example 17, the bromine content of the polymer after extraction was "none detected" with a detection limit of 0.2%. Before extraction (but after precipitation) it contained 12.19% bromine.

EXAMPLE 19

84.6 g of graft concentrate from Example 2 and 5.4 g Atactic Polypropylene (diluent) were blended in a Brabender Plasticorder for 10 minutes at 190° C. A portion of the mixture was put into a test tube and placed in an oven at 190°-200° C. for 7 hours. The mixture was cooled, the glass broken away, and samples were taken from near the top and bottom. Bromine content near the top was 36.5%, and near the bottom it was 37.2%. Based on the materials added, the bromine content should have been 38.1%. Thus, the blend of this Example demonstrated excellent ability to remain substantially homogenous under melt conditions.

EXAMPLE 20

COMPARATIVE EXAMPLE

The following were blended as in Example 19:
21.6 g Polypropylene (AMOCO 10-5219)
63.0 g Polydibromostyrene Homopolymer
5.4 g Atactic Polypropylene (diluent)
Part of the mixture was put into a test tube, heated and sampled as in Example 19. In contrast to the results in Example 19, bromine content near the top was 12.8% while it was 48.6% near the bottom. Calculated bromine content was 40.9% based on the materials charged.

EXAMPLE 21

Known graft polymerization procedures are used to graft Great Lakes Dibromostyrene to polypropylene in amounts whereby the graft polymerization products comprise about 1% to about 60% by weight bromine.

EXAMPLE 22

The graft polymerization products of Example 21 having about 10% to about 60% by weight bromine are blended with polypropylene using known techniques to achieve bromine levels in the final blend ranging from about 1% to about 20% by weight bromine.

EXAMPLE 23

Physical properties were determined for several of the molded compositions. Results are shown in Table 2.

TABLE 2

| Physical Property Test Results | | | | |
|---|---|---|---|---|
| | Compar. Ex. 14 | Ex. 9 | Ex. 11 | Compar. Ex. 13 |
| Flex. Strength, psi | 6600 | 8290 | 7570 | 8000 |
| Flex. Mod. psi $\times 10^5$ | 2.13 | 2.81 | 2.64 | 2.95 |
| Tensile Strength, psi | 5250 | 5660 | 5530 | 5300 |
| Elong. @Peak, % | 8.4 | 6.8 | 7.1 | 3.6 |
| Tensile Mod., psi $\times$ 105 | 2.24 | 2.73 | 2.59 | 2.84 |

TABLE 2-continued

| Physical Property Test Results | | | | |
|---|---|---|---|---|
| | Compar. Ex. 14 | Ex. 9 | Ex. 11 | Compar. Ex. 13 |
| Izod Impact (Unnotched), ft. lbs./in. | 21.7 | 5.9 | 17.9 | 8.5 |

As Table 2 demonstrates, the preferred compositions retain desirable physical properties. For instance, the preferred compositions prepared in Examples 9 and 11 demonstrate superior tensile strengths as compared to the unmodified polypropylene of Example 14 as well as the polypropylene/polydibromostyrene blend of Example 13. Additionally, the preferred compositions avoid the excessive stiffening which occurred in the blend of Example 13 as evidenced by their respective elongation percent values. In another aspect the blend of Example 11 in particular proved to be surprisingly tough and durable as measured by impact strength.

EXAMPLE 24

Molded specimens were tested for flammability using the Underwriters Laboratories Standard UL-94 and the ASTM D 2863 Oxygen Index Test. Results are shown in Table 3:

TABLE 3

| Flammability Test Results | | | | |
|---|---|---|---|---|
| | Comp. Ex. 14 | Ex. 9 | Ex. 15 | Ex. 11 | Comp Ex. 13 |
| Bromine Content, % | 0.0 | 8.4 | 9.1 | 12.9 | 12.9 |
| UL-94, 1/16 inch | Fail | Fail | 94V-2 | 94V-2 | Fail |
| Oxygen Index, %02 | 19.0 | 24.0 | 24.5 | 25.0 | 22.5 |

As illustrated in Table 3, the let down as well as other preferred compositions demonstrate surprising and superior efficiency in resistance to flame. Specifically, for example, despite having bromine levels equal to or even less than the polypropylene/polydibromostyrene blend of Example 13, preferred compositions prepared in Examples 9, 11 and 15 showed unexpectedly greater oxygen index values. These results combined with the results set forth in Table 2 demonstrate the magnitude of the applicants discovery, which addresses head on the long felt desire and need for improved fire retardant polypropylene compositions.

While the invention has been described in detail in the foregoing description and its specific Examples, the same is to be considered as illustrative and not restrictive in character, it being understood that only the preferred embodiments have been described and that all changes and modifications that come within the spirit of the invention are desired to be protected.

What is claimed is:

1. A flame retardant graft copolymer composition comprising:

wherein n is >1, P is polypropylene, and S is a grafted side chain having brominated monomeric units of the formula:

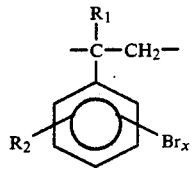

wherein x=1 to 4, $R_1$ is H or $CH_3$, and $R_2$ is H or a $C_{1-4}$ lower alkyl group, said graft copolymer including at least about 1% bromine by weight of graft copolymer.

2. A flame retardant graft copolymer composition according to claim 1 comprising about 1% to about 60% by weight bromine.

3. A flame retardant graft copolymer composition according to claim 2 comprising about 1% to about 20% by weight bromine.

4. A flame retardant graft copolymer composition according to claim 3 comprising about 3% to about 15% by weight bromine.

5. A flame retardant graft copolymer composition according to claim 2 comprising about 10% to about 60% by weight bromine.

6. A flame retardant graft copolymer composition according to claim 5 comprising about 30% to about 50% by weight bromine.

7. A flame retardant graft copolymer composition according to claim 1 and containing at most about 3% by weight of unreacted brominated monomer corresponding to the brominated monomeric units.

8. A flame retardant graft copolymer composition according to claim 7 and containing at most about 1% by weight of said unreacted brominated monomer.

9. A flame retardant graft copolymer composition according to claim 1 in which $R_1$ and $R_2$ are each H.

10. A flame retardant graft copolymer composition according to claim 1 in which at least about 80% of said brominated monomeric units have formulas wherein x=2.

11. A flame retardant polymer composition comprising:

a graft copolymer represented by the formula:

wherein n is >1, P is polypropylene, and S is a grafted side chain having brominated monomeric units of the formula:

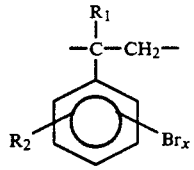

wherein x=1 to 4, $R_1$ is H or $CH_3$, and $R_2$ is H or a $C_{1-4}$ lower alkyl group, said graft copolymer including at least about 0.5% bromine by weight of graft copolymer; and a homopolymer of said brominated monomeric units, said graft copolymer and said homopolymer together including at least about 1% bromine by weight of the overall polymer composition.

12. A flame retardant polymer composition according to claim 11 and containing at most about 3% by weight of unreacted brominated monomer corresponding to the brominated monomeric units.

13. A flame retardant polymer composition according to claim 12 and containing at most about 1% by weight of said unreacted brominated monomer.

14. A flame retardant polymer composition according to claim 12 comprising about 1% to about 60% bromine by weight of the overall polymer composition.

15. A flame retardant polymer composition according to claim 14 comprising about 1% to about 20% bromine by weight of the overall polymer composition.

16. A flame retardant polymer composition according to claim 15 comprising about 3% to about 15% bromine by weight of the overall polymer composition.

17. A flame retardant polymer composition according to claim 14 comprising about 10% to about 60% bromine by weight of the overall polymer composition.

18. A flame retardant polymer composition according to claim 17 comprising about 30% to about 50% bromine by weight of the overall polymer composition.

19. A flame retardant polymer composition according to claim 11 in which $R_1$ and $R_2$ are each H.

20. A flame retardant polymer composition according to claim 11 and which exhibits an ASTM D-2863 Oxygen Index of at least about 24.

21. A flame retardant polymer composition according to claim 11 and which exhibits a tensile strength of at least about 5500 psi.

22. A flame retardant polymer composition according to claim 11 in which at least about 85% of said brominated monomeric units have formulas wherein $x=2$, 3 or 4.

23. A flame retardant polymer composition according to claim 11 in which at least about 80% of said brominated monomeric units have formulas wherein $x=2$.

24. A flame retardant polymer composition comprising a blend of (i) polypropylene and (ii) a bromine-concentrated polymer composition, said bromine-concentrated polymer composition including about 10% to about 60% bromine by weight and including a graft copolymer represented by the formula:

$$\begin{array}{c} P \\ | \\ (S)_n \end{array}$$

wherein n is $>1$, P is polypropylene, and S is a grafted side chain having brominated monomeric units of the formula:

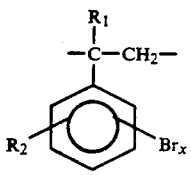

wherein $x=1$ to 4, $R_1$ is H or $CH_3$, and $R_2$ is H or a $C_{1-4}$ lower alkyl group, said graft copolymer including at least about 5% bromine by weight of graft copolymer, said polymer composition containing at least about 1% bromine by weight of the overall polymer composition.

25. A flame retardant polymer composition according to claim 24 in which said bromine-concentrated polymer composition also includes a homopolymer having said brominated monomeric units, said graft copolymer and said homopolymer together providing the about 10% to about 60% by weight bromine.

26. A flame retardant polymer composition according to claim 25 in which said bromine-concentrated polymer composition comprises about 30% to about 50% by weight bromine.

27. A flame retardant polymer composition according to claim 25 and which includes about 1% to about 20% bromine by weight of the overall polymer composition.

28. A flame retardant polymer composition according to claim 27 and which includes about 3% to about 15% bromine by weight of the overall polymer composition.

29. A flame retardant polymer composition according to claim 25 in which $R_1$ and $R_2$ are each H.

30. A flame retardant polymer composition according to claim 25 and which exhibits an ASTM D-2863 Oxygen Index of at least about 24.

31. A flame retardant polymer composition according to claim 25 and which exhibits a tensile strength of at least about 5500 psi.

32. A flame retardant polymer composition according to claim 25 and which exhibits an Unnotched Izod Impact Strength of at least about 15 ft. lbs./in.

33. A flame retardant polymer composition according to claim 25 in which $x=2$, 3 or 4 for at least about 85% of said brominated monomeric units.

34. A flame retardant polymer composition according to claim 25 in which $x=2$ for at least about 80% of said brominated monomeric units.

35. A flame retardant polymer composition according to claim 25 comprising at most about 3% by weight of unreacted monomer corresponding to said brominated monomeric units.

36. A flame retardant polymer composition according to claim 35 comprising at most about 1% by weight of said unreacted monomer.

37. A process for making a flame retardant polymer composition, comprising the step of graft polymerizing polypropylene with a monomer of the formula:

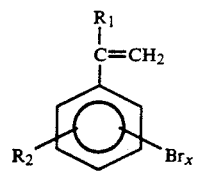

wherein $x=1$ to 4, $R_1$ is H or $CH_3$, and $R_2$ is H or a $C_{1-4}$ lower alkyl group, to provide at least about 1% bromine by weight of the composition.

38. The process of claim 37 in which at least about 80% of the monomers have formulas wherein $x=2$.

39. The process of claim 37 in which at least about 85% of the monomers have formulas wherein $x=2$, 3 or 4.

40. The composition of claim 1 and which consists essentially of said copolymer.

41. The composition of claim 40 in which at least about 85% of the monomeric units have formulas wherein $x=2$, 3 or 4.

42. The composition of claim 11 and which consists essentially of said graft copolymer and said homopolymer.

43. The composition of claim 42 in which at least about 85% of the monomeric units have formulas wherein $x = 2, 3$ or $4$.

44. The composition of claim 24 and which consists essentially of said polypropylene and said graft copolymer.

45. The composition of claim 43 in which at least about 85% of the monomeric units have formulas wherein $x = 2, 3$ or $4$.

46. The composition of claim 25 and which consists essentially of said polypropylene, said graft copolymer and said homopolymer.

47. The composition of claim 46 in which at least about 85% of the monomeric units have formulas wherein $x = 2, 3$ or $4$.

* * * * *